United States Patent
Adl-Tabatabai et al.

(10) Patent No.: US 8,984,492 B2
(45) Date of Patent: Mar. 17, 2015

(54) INCREMENTAL COMPILATION OF A SCRIPT CODE IN A DISTRIBUTED ENVIRONMENT

(71) Applicant: Facebook, Inc., Menlo Park, CA (US)

(72) Inventors: Ali-Reza Adl-Tabatabai, San Jose, CA (US); Guilherme de Lima Ottoni, Campbell, CA (US); Keith Adams, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 67 days.

(21) Appl. No.: 13/797,789

(22) Filed: Mar. 12, 2013

(65) Prior Publication Data

US 2014/0282449 A1    Sep. 18, 2014

(51) Int. Cl.
G06F 9/45    (2006.01)
G06F 9/455    (2006.01)

(52) U.S. Cl.
CPC .................................. *G06F 9/4552* (2013.01)
USPC .......................................... 717/130; 717/143

(58) Field of Classification Search
None
See application file for complete search history.

(56) References Cited

U.S. PATENT DOCUMENTS

| | | | |
|---|---|---|---|
| 7,003,517 B1* | 2/2006 | Seibel et al. | 1/1 |
| 2002/0032582 A1* | 3/2002 | Feeney et al. | 705/2 |
| 2006/0004731 A1* | 1/2006 | Seibel et al. | 707/3 |

* cited by examiner

*Primary Examiner* — Chuck Kendall
(74) *Attorney, Agent, or Firm* — Perkins Coie LLP

(57) ABSTRACT

Disclosed here are methods, systems, paradigms and structures for incrementally compiling scripts at runtime to generate executable code. In a first phase, an executable block for a basic block of the script is generated for a set of types of variables of the basic block. In a second phase, a set of executable blocks whose profiling information, such as frequency of (a) execution, (b) transition between executable blocks, or (c) execution of a path, satisfies an optimization criterion is identified, and an executable control region is generated. In a third phase, profiling information from a number of systems in a distributed environment is aggregated, and an executable control region corresponding to the aggregated profile is generated. The executable code generated in each of the phases is more optimal than the code generated in a previous phase, and is used for execution until replaced by the code of a subsequent phase.

20 Claims, 16 Drawing Sheets

INCREMENTAL COMPILATION OF A SCRIPT CODE IN A DISTRIBUTED ENVIRONMENT

FIELD OF INVENTION

This invention relates to compilation of script code in general and more specifically to incremental compilation of script code at runtime in a distributed environment.

BACKGROUND

Scripting languages offer simplicity and ease of development to software developers. Script code is easy to write since scripting languages are often based on a small set of expressions and statements that are simple to learn. Software developers often use scripting languages for rapid development of applications, for example, web applications. Scripting languages may be used for server side programs or for client side programs. Examples of server side scripting languages include PHP (Personal Home Page) and examples of client side scripting languages include JAVASCRIPT.

Server side script code can be used for executing a user request received at a web server by dynamically generating web pages. Server side scripting is often used for implementation of interactive websites that interface with data stores for retrieving and storing information. The PHP scripting language allows embedding of script code with hypertext markup language (HTML). Client side script code is often used for performing simple computations on the client side rather than sending a request to the server for simple computations.

Conventional approaches to execute script code include executing the script code using an interpreter. However, an interpreter may not be able to perform several optimizations that a compiler that generates executable code can perform. Therefore, interpreting script code can be inefficient compared to running executable code obtained by compiling the script code. Furthermore, scripting languages often allow simplified syntax that makes it easier for a user to write script code. For example, scripting languages often support untyped variables that do not require a user to provide type information of the variable. As a result, a compiler processing script code may not have the required information for performing certain optimizations. For example, compiler optimizations often require knowledge of types of the variables that is not available in script code based on untyped variable. Even if the knowledge of types is available, the compilation techniques, especially just-in-time compilation techniques, do not generate optimal executable code for a particular execution instance.

Further, if the same script code is executing on different systems in a distributed environment, the potential knowledge of the execution pattern of the script code on different systems is not made use of to further optimize the execution of the script code in the distributed environment. Accordingly, the current distributed environments do not provide an improved efficiency in executing the script code in the distributed environment.

SUMMARY

Introduced here are methods, systems, paradigms and structures for incrementally compiling scripts at runtime to generate executable code. The incremental compilation generates executable blocks corresponding to basic blocks of a script. In a first phase, an executable block for a basic block of the script is generated for a set of types of variables of the basic block. The generated executable block is stored and executed for subsequent requests. In a second phase, a set of executable blocks whose profiling information, such as a frequency of (a) execution, (b) transition between two executable blocks, or (c) execution of a particular path, satisfies an optimization criteria is identified. The basic blocks corresponding to the identified set of executable blocks are combined, and an executable control region is generated for executing the basic blocks. The generated executable control region is stored and executed for subsequent requests. Executing the script using the executable control region is more optimal than executing using the executable blocks generated in the first phase.

If the script is executing on a number of systems in a distributed environment, the execution of the script on the systems may be further improvised, in a third phase, by using the profiling information of the script executing on each of the systems in the distributed environment. The profiling information generated by each of the systems is aggregated to generate an aggregated profile for the script. The executable blocks corresponding to the aggregated profile are identified, and an executable control region is generated for the portion of the script corresponding to the identified executable blocks. The generated executable control region is stored and executed for subsequent requests. The executable control region generated based on the aggregated profile is more efficient compared to the executable control region generated for each of the systems separately because the executable control region for the aggregated profile considers the execution pattern of the script in the entire distributed system rather than an individual system.

The profiling information may be aggregated based on various aggregation criteria. The aggregation criteria can include aggregating profiling information from systems having a particular type of processor, particular type of operating system, aggregating profiling information most frequently executed paths in the systems etc.

Some embodiments of the disclosed technique have other aspects, elements, features, and steps in addition to or in place of what is described above. These potential additions and replacements are described throughout the rest of the specification.

BRIEF DESCRIPTION OF THE DRAWINGS

FIG. 8, which includes

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed here are methods, systems, paradigms and structures for incrementally compiling scripts at runtime to generate executable code. The incremental compilation generates executable code corresponding to basic blocks of a script in various phases and at various scopes. In a first phase, an executable code for a basic block of the script is generated for a set of types of variables of the basic block. The generated executable block is stored and executed for subsequent requests. In a second phase, a set of executable blocks whose profiling information, such as a frequency of (a) execution, (b) transition between two executable blocks, or (c) execution of a particular path, satisfies an optimization criteria is identified. The basic blocks corresponding to the identified set of executable blocks are combined, and an executable control region is generated for executing the basic blocks. The generated executable control region is stored and executed for subsequent requests. The executable control region is more optimal than the executable blocks generated in the first phase.

If the script is executing on a number of systems in a distributed environment, the execution of the script on the systems may be further improvised, in a third phase, by using, at least, the profiling information of the script executing on each of the systems in the distributed environment. The profiling information generated by each of the systems is aggregated to generate an aggregated profile for the script. The executable blocks corresponding to the aggregated profile are identified, and an executable control region is generated for the portion of the script corresponding to the identified executable blocks. The generated executable control region is stored and executed for subsequent requests. The executable control region generated based on the aggregated profile is more efficient compared to the executable control region generated for each of the systems separately because the executable control region for the aggregated profile considers the execution pattern of the script in the entire distributed system rather than an individual system.

The profiling information may be aggregated based on various aggregation criteria. The aggregation criteria can include aggregating profiling information from systems having a particular type of processor, particular type of operating system, aggregating profiling information most frequently executed paths in the systems etc.

Figure 1:
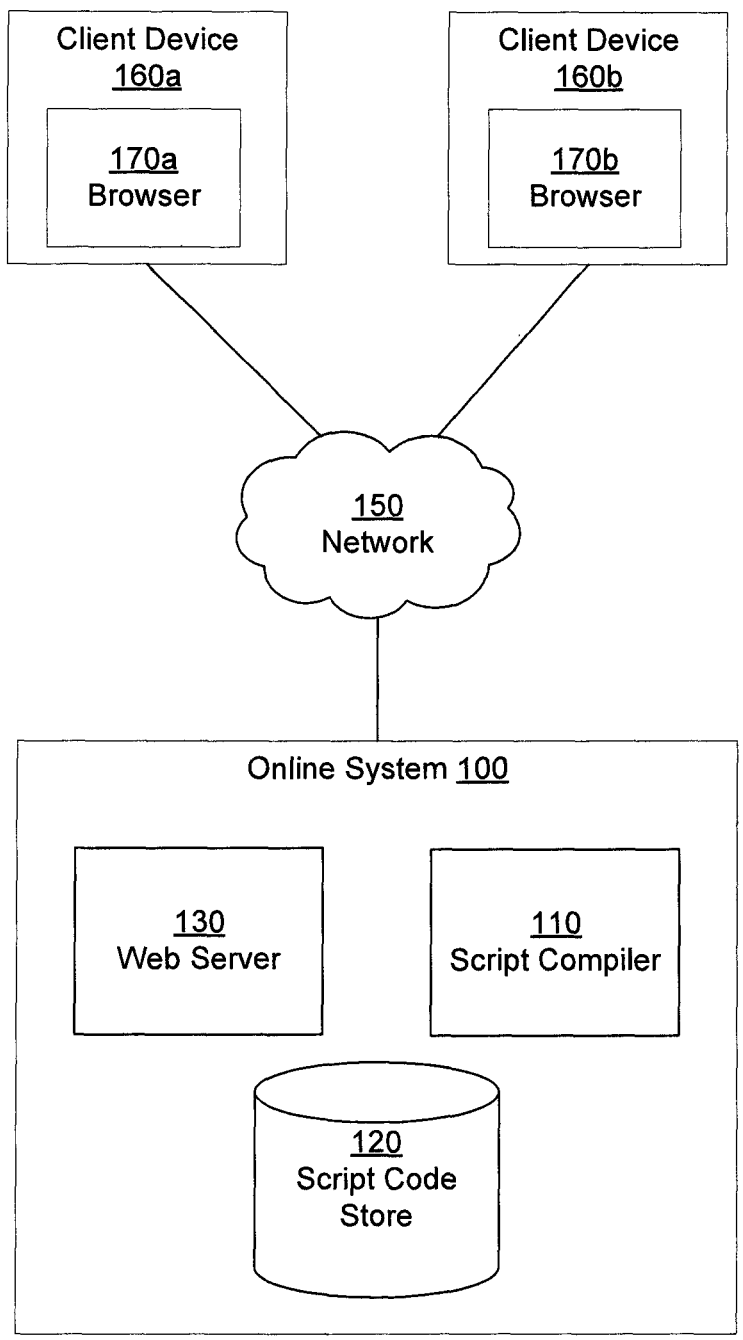
FIG. 1 is an environment in which an embodiment of the disclosed technique may operate.

FIG. 1 shows a system environment for allowing a client device to interact with an online system that generates dynamic web pages by compiling script code, in accordance with an embodiment of the disclosed technique. FIG. 1 illustrates client devices 160 interacting with an online system 100 using the network 150. The client devices 160 send requests to the online system 100 via the network 150. The online system 100 may dynamically generate web pages in response to the request and send the generated web pages to the client device 160 in response to the request.

FIG. 1 and the other figures use like reference numerals to identify like elements. A letter after a reference numeral, such as "160*a*," indicates that the text refers specifically to the element having that particular reference numeral. A reference numeral in the text without a following letter, such as "160," refers to any or all of the elements in the figures bearing that reference numeral (e.g. "160" in the text refers to reference numerals "160*a*" and/or "160*b*" in the figures).

Embodiments of the computing environment can have multiple client devices 160 and multiple online systems 100 connected to the network 150. Certain functionality described in one embodiment as being performed on the server side can also be performed on the client side in other embodiments if appropriate. For example, although FIG. 1 shows the script compiler 110 running on the online system 100 for compiling server side script code, in other embodiments, the script compiler 110 may run on the client device 160 for compiling client side script code. In addition, the functionality attributed to a particular component can be performed by different or multiple components operating together.

The client devices 160 include one or more computing devices that can receive user input and can transmit and receive data via the network 150. The client device 160 can execute an application, for example, a browser application 170 that allows a user of the client device 160 to interact with the online system 100. A user may provide input using a user interface presented to the user via the browser application 170. The interactions of the user via the browser application 170 may cause the browser application 170 to send a request for information that identifies a markup language document including server side scripting code. The markup language document is processed to obtain a transformed markup language document that is returned in response to the request.

The network 150 uses standard communications technologies and/or protocols. Thus, the network 150 can include links using technologies such as Ethernet, 802.11, worldwide interoperability for microwave access (WiMAX), 3G, digital subscriber line (DSL), etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 170 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc.

The online system 100 comprises a web server 130, a script compiler 110 and a script code store 120. The web server 130 is a module processing requests received by the online system 100 from client devices 160 or other external systems that interact with the online system 100. The web server 110 may be implemented by conventional web server software, such as APACHE or INTERNET INFORMATION SERVICES. In response to a request from a client device 160, the web server 130 may invoke other modules of the online system 100 to process the request. For example, the web server 130 may invoke modules of the online system 100 to obtain a web page in response to the request from the client device 160. The web server 130 sends the web page to the client device 160 for presentation on the browser 170.

The script code store 120 stores script code that implements portions of functionality provided by the online system 100 to client devices 160. A script code may include a function, procedure, method, or a block of code that may be embedded within an HTML document. The script code implements functionality, for example, retrieving information stored in various databases of the online system 100, performing computations, or interacting with other systems.

The script compiler 110 takes script code in source code form and generates equivalent executable code for execution by a processor of the online system 100 (in this disclosure, the term "script code" is also referred to as "script.) In an embodiment, the script compiler 110 performs incremental compilation of the script code in a lazy fashion. For example, a portion of script code is compiled if a request causes this portion of script code to execute. Once a portion of the script code is compiled, the generated executable code is available for future requests. However, if no request received by the online system 100 needs to execute a particular portion of the script code, that particular portion may not be compiled. Therefore, no executable code corresponding to a particular portion of script may exist in the online system 100 if no request from a client device needs to execute that portion of script. For example, a script may include an "if-then-else" statement that executes an "if" portion of script if a condition evaluates to true and an "else" portion of script if the condition evaluates to false. If all incoming requests evaluate the condition to a true value, these request only execute the "if" part of the script. Accordingly, executable code corresponding to the "else" part of the "if-then else" statement may never be generated, unless an incoming request results in the condition being evaluated to a false value.

Figure 2:
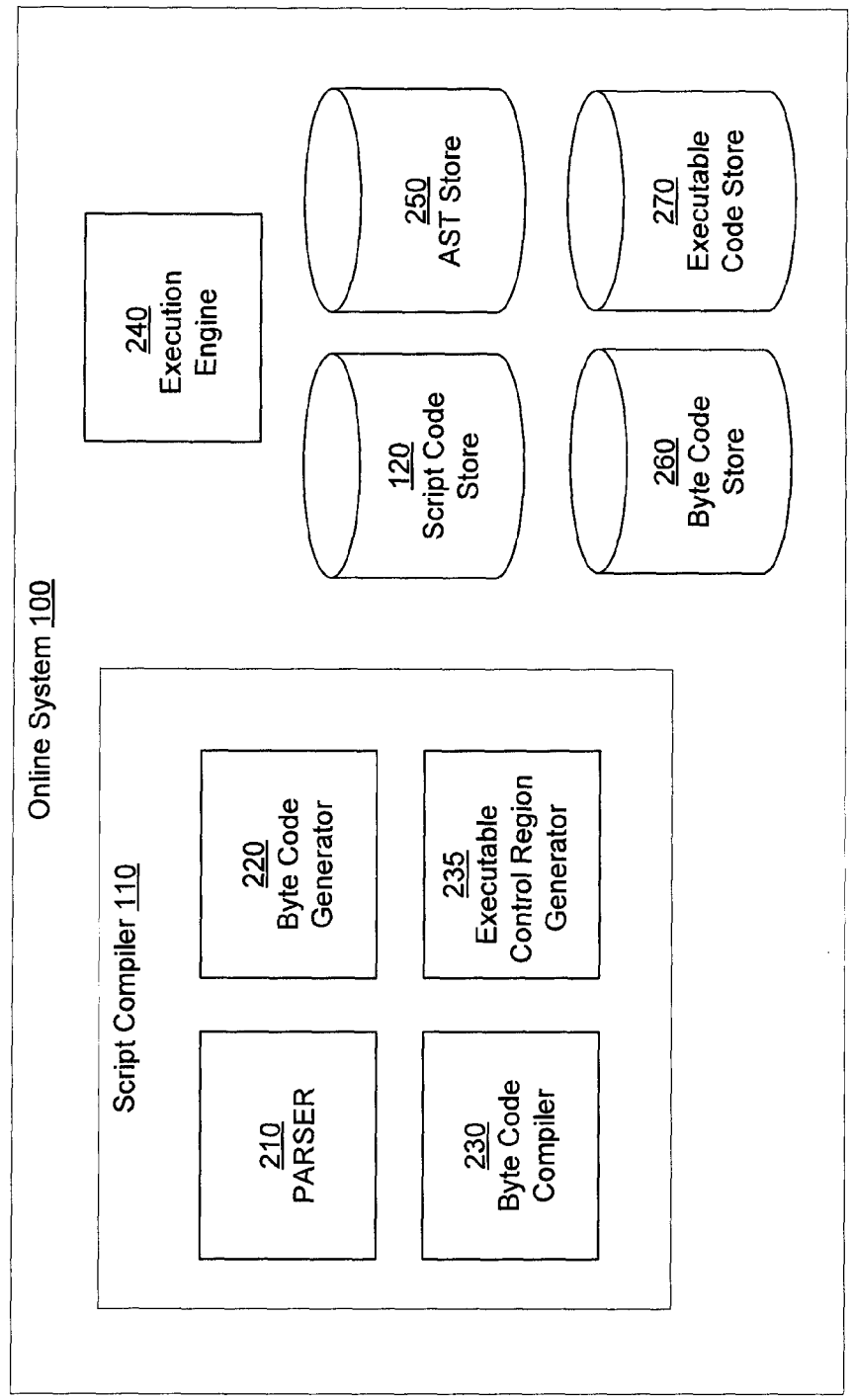
FIG. 2 is a block diagram illustrating an architecture of an online system that generates dynamic web pages by incrementally compiling script code at runtime.

FIG. 2 illustrates an architecture of an online system 100 that generates dynamic web pages by incrementally compiling script code at runtime, in accordance with an embodiment of the disclosed technique. The online system includes the script code store 120, an abstract syntax tree (AST) store 250, a byte code store 260, an executable code store 270, an execution engine 240, and the script compiler 110. The script compiler 110 further includes a parser 210, a byte code generator 220, and a byte code compiler 230. Some embodiments of the online system 100 have different and/or other modules than the ones described herein, and the functions can be distributed among the modules in a different manner than is described here. For example, several modules shown in the online system 100 may be present in a client device 160 if the script code being processed is client side script code.

The script code store 120 stores script code, for example, script code specified as PHP, server side JAVASCRIPT, or another syntax. The script code may be input by a software developer using an editor or copied from another computer. In an embodiment, the script code is specified in a human readable text form. The parser 210 reads the script code from one or more files in the script code store 120 and builds a data structure called an AST that is stored in the AST store 250. The AST is a hierarchical tree representation of script code.

The parser 125 checks the script code for syntax errors and reports the errors to allow a user to correct the errors.

The byte code generator 220 traverses the AST representation of the script code and generates byte code corresponding to the script code. The byte code is stored in the byte code store 260. The byte code includes code represented using an instruction set that is designed for efficient execution by an interpreter or for efficient compilation into executable code, for example, machine code. The byte code instructions may correspond to a virtual stack machine or a virtual register machine. The byte code compiler 230 converts byte code into executable code and stores the generated executable code in the executable code store 270.

The execution engine 240 executes the instructions available in the executable store 270. For example, the execution engine 240 may be invoked in response to a request received from a client device 160. The execution engine 240 identifies executable code corresponding to the request received for execution. An online system 100 may compile all available byte code stored in the byte code store 260, for example, as a batch process and store the generated executable code in the executable code store 270. Compiling all available byte code store in advance ensures that executable code is readily available for any request that is received by the online system, so long as the corresponding script code is available in the script code store 120. However, script code typically supports features that make it difficult to generate efficient executable code. For example, script code may support untyped variable for which the type is not available until runtime. Programmers often use untyped variables since they do not require the programmer to make early decisions regarding types of variables used. A programmer may specify a variable as untyped even if at runtime the variable only stores values of one particular type, for example, an integer value. In practice significant amount of script code is executed based on a limited set of types corresponding to the untyped variables. However, if the online system 100 compiles the byte code to executable code prior to receiving the requests at runtime, the type information may not be available for the variables. A byte code compiler 230 that compiles the byte code without making any specific assumptions about the types of the variables may generate inefficient executable code since the generated executable code accounts for all possible types that each untyped variable may take, whether or not the incoming requests use these types.

Embodiments of the byte code compiler 230 compile byte code to executable code based on information available at runtime. For example, the byte code compiler 230 may utilize type information of variables obtained during an execution of the script code to generate executable code optimized for these specific types. Accordingly, executable code required for executing a request may or may not be available in the executable code store 270 at runtime. If executable code corresponding to the request is not available in the executable code store 270, the execution engine 240 identifies byte code corresponding to the request from the byte code store 230. The execution engine 240 invokes the byte code compiler 230 to compile the byte code corresponding to the request to generate executable code. The execution engine 240 provides type information of variables obtained during the current execution of the script code to the byte code compiler 230. Accordingly, the byte code compiler 230 generates efficient executable code based on the type information of variables available. The execution engine 240 executes the generated executable code. In some embodiments, executable code may be generated directly from script code without requiring byte code generation.

If future executions of the script code provide variables of the same type as the first request, the executable code can be reused for the future requests. However, if a subsequent execution provides a different combination of types of variables compared to the first execution, the execution engine 240 invokes the byte code compiler 230 to generate executable code corresponding to the new combination of types corresponding to the variables. Accordingly, the executable code store 270 may store different executable codes for the same byte code program, each executable code corresponding to a different combination of variable types. The byte code compiler 230 may never generate executable code corresponding to type combinations that are never received in executions of the script code.

In an embodiment, the byte code compiler 230 compiles a basic block of byte code at a time. A basic block of code has one entry point, i.e., no instruction within the basic block other than the entry point can be reached from anywhere in the script code as a destination of a jump instruction. The entry point is typically the first instruction of the basic block. A basic block may have one or more exit point, i.e., typically the last instruction of the basic block causes the program control to start executing another basic block. The last instruction may evaluate certain condition and determine the next basic block for execution based on the result of the evaluation of the condition. For example, the last instruction may evaluate a binary condition and transfer program control to one basic block if the condition evaluates to true otherwise transfer program control to another basic block (if condition evaluates to false). Similarly, the last instruction of the basic block may transfer control to different basic blocks based on the value of a particular variable. For example, if the variable value is 1, program control is transferred to basic block B1, if the variable value is 2, program control is transferred to basic block B2, if the variable value is 3, program control is transferred to basic block B3, and so on. The simple structure of a basic block makes it easy for the byte code compiler 230 to optimize and compile a basic block.

The executable code of the script includes executable blocks (also referred as "executable basic blocks") of the script and/or executable control regions of the script. An executable block corresponds to a basic block of the script (which is described in further detail with reference to FIGS. 4 and 5), whereas an executable control region of the script includes instructions for executing a set of basic blocks. An executable control generator 235 generates an executable control region for a set of basic blocks based on various criteria (which is described in further detail with reference to FIGS. 6-10).

Figure 3:
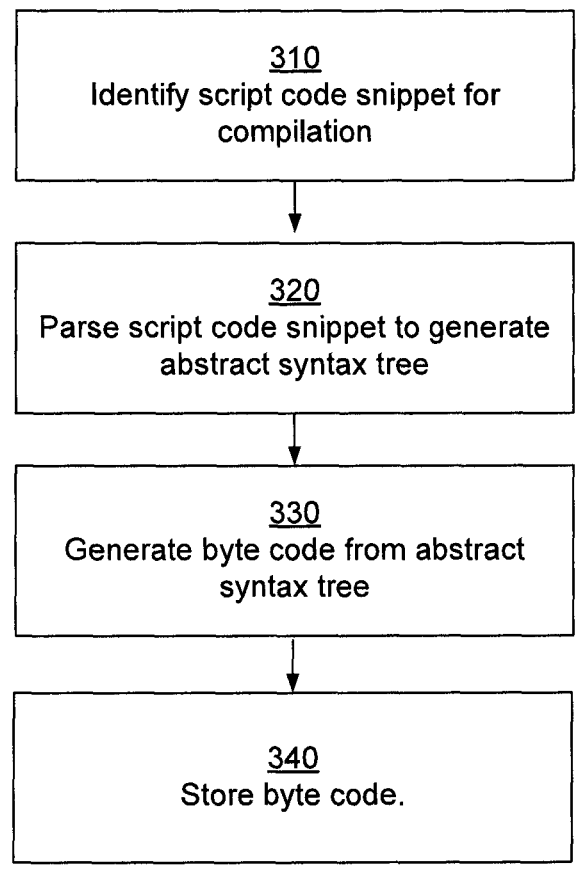
FIG. 3 is a flow diagram illustrating the process of compiling script code.

FIG. 3 is a flow diagram illustrating the process of compiling script code, in accordance with one embodiment of the disclosed technique. The process illustrated in FIG. 3 may be executed by the script compiler 110 as a batch process that compiles script code stored in the script code store 120. For example, software developers may periodically provide new scripts implementing certain features of the online system 100. The received script code may be compiled as a batch process by the online system 100. Alternatively, software developers may update existing script code, thereby requiring recompilation of the updated script code. The script compiler 110 may repeat the steps shown in FIG. 3 for all the script code that need to be recompiled.

The script compiler 110 identifies 310 a script for compilation. The script compiler 110 invokes the parser 210 for parsing the script. The parser 210 parses 320 the script code to generate an AST representation of the script code. The parser 210 stores the AST representation in the AST store 250. In an embodiment, modules of the script compiler 110 perform various operations using the AST representation, for example, static analysis, type inference, and optimizations. As a result, the script compiler 110 may annotate the AST and/or transform the AST. The script compiler 110 stores the annotated ASTs or the transformed ASTs in the AST store 250. Each step performed by the script compiler 110 typically use the latest version of the AST from the AST store 250 and generates a subsequent version of the AST. The byte code compiler 230 generates 330 byte code from the AST representation of the script code and stores 340 the generated byte code in the byte code store 260.

The byte code compiler 230 incrementally compiles the byte code stored in the byte code store at runtime to generate corresponding executable code. The byte code compiler 230 performs the incremental compilation responsive to executions of the script code, for example, executions caused by requests received from client devices 160.

In at least some embodiments, the execution engine 240 requests compilation of one basic block of byte code at a time. More specifically, the execution engine 240 requests compilation of one basic block for a particular combination of types of the variables as required for execution of an incoming request. In at least some other embodiments, the execution engine 240 may request compilation of a group of basic blocks to generate more optimal executable code. Additionally or alternatively, the execution engine 240 may request the compilation of one basic block during a first phase of execution of the script, and request compilation of group of basic blocks during a second phase of execution.

Figure 4:
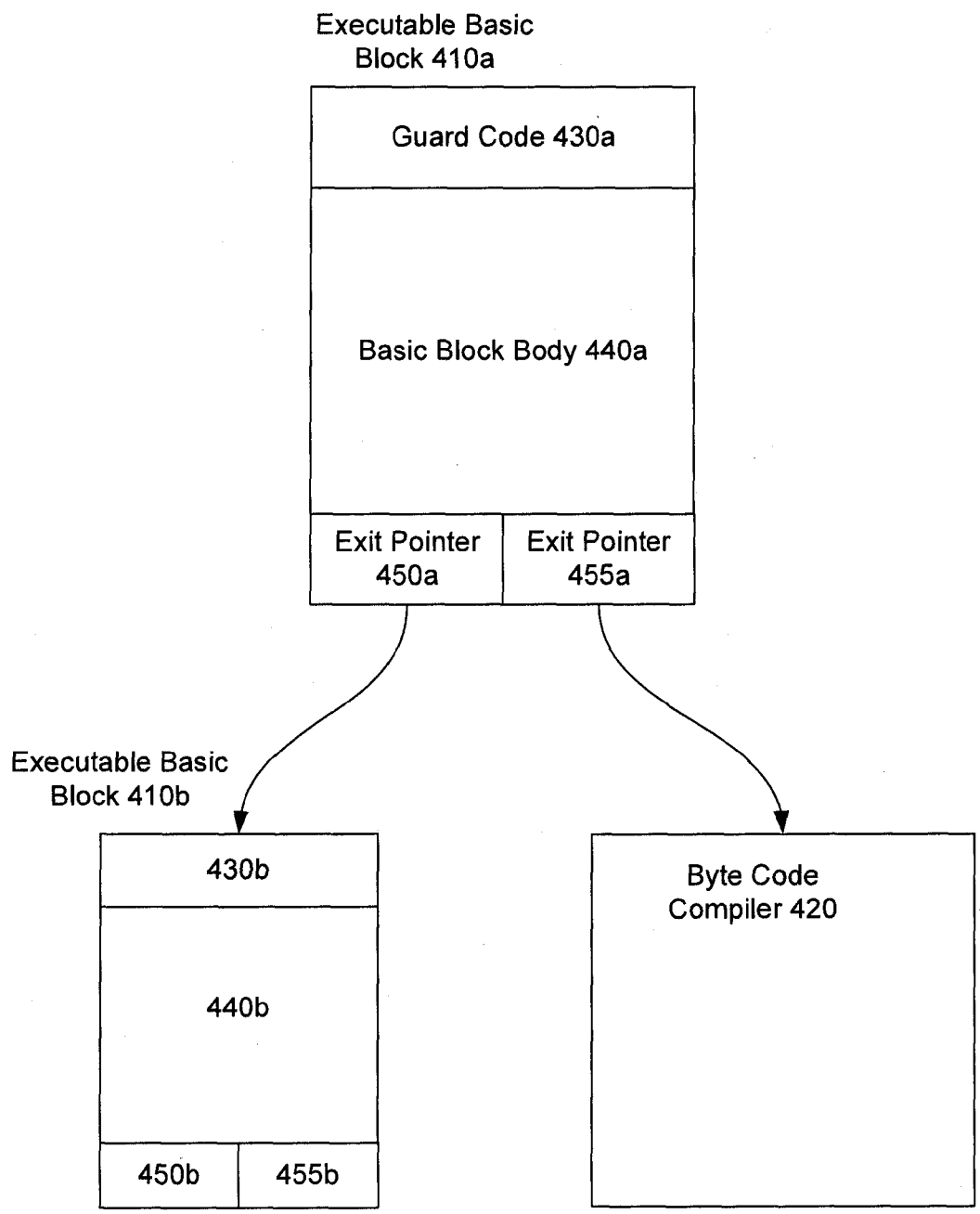
FIG. 4 illustrates the structure of executable code generated by a script compiler.

FIG. 4 is a diagram illustrating the structure of executable code generated by a script compiler, in accordance with one embodiment of the disclosed technique. The generated executable basic block 410 includes a portion of guard code 430, a basic block body 440, and one or more exit pointers 450. The executable basic block 410 is generated in response to receiving a request from the client device 160. Accordingly, the executable basic block 410 is optimized for the types of variables as provided by the incoming request.

The following example illustrates how executable code is generated for a given basic block. Assume that a basic block includes two untyped variables varA and varB. Further assume that for a particular execution it is determined that both variables varA and varB are integers. Accordingly, the byte code compiler 230 compiles the basic block to generate the basic block body 440 assuming the variables varA and varB are integers. The guard code 430 includes instructions that check a particular condition before executing the basic block body 440. In the above example, the generated guard code 430 verifies that the types of variables varA and varB are integers. If the types of both variables are integers, the guard code 430 continues execution of the basic block body 440.

The last instruction of an executable basic block 410a that is executed typically causes the program control to begin execution of another executable basic block 410b. Accordingly, the last instruction of the executable basic block 410 may include an exit pointer 450 that specifies the address of an executable basic block 410b for execution after the execution of the executable basic block 410. The last instruction of an executable basic block 410a that is executed may transfer control to different executable basic blocks 410 depending on certain criteria. For example, the last instruction in a basic block may correspond to an "if" condition that executes one basic block if the condition is evaluated to true and another basic block if the condition is evaluated to false. Therefore, the last instruction of the executable basic block 410 may include one or more exit pointers 450a, 455a, and so on.

The exit pointer 450a points to another executable basic block 410b. If a particular executable block that needs to be executed subsequent to the execution of the executable basic block 410a has not been compiled so as to generate a corresponding executable basic block, the corresponding exit pointer 455a transfers control to the byte code compiler 420. The byte code compiler 420 may be provided with information describing the subsequent basic block that needs to be compiled. The address of the subsequent basic block may be communicated to the byte code compiler 420 using function-calling conventions of the native machine in which the system is hosted. In this embodiment, the byte code compiler 420 obtains the address of the byte code corresponding to the subsequent basic block to be compiled from the top of the stack. Once the byte code compiler 420 generates an executable basic block 410 corresponding to the subsequent basic block, the pointer 455a is changed to point to the generated executable basic block instead of the byte code compiler 420.

In at least some embodiments, the byte code compiler 230 generates different executable basic blocks for different combinations of type of the variables of a basic block. That is, the byte code compiler 230 generates one executable basic block for variable types integer, another executable basic block where both the variables are float, another executable basic block where one variable is integer and another is float and so on.

Further, in at least some other embodiments, the executable basic blocks may be generated based on criterion other than type of variables in the basic block. The guard code would have instructions accordingly to verify the criteria based on which the executable block is created before the basic block body of the executable block is executed.

Figure 5:
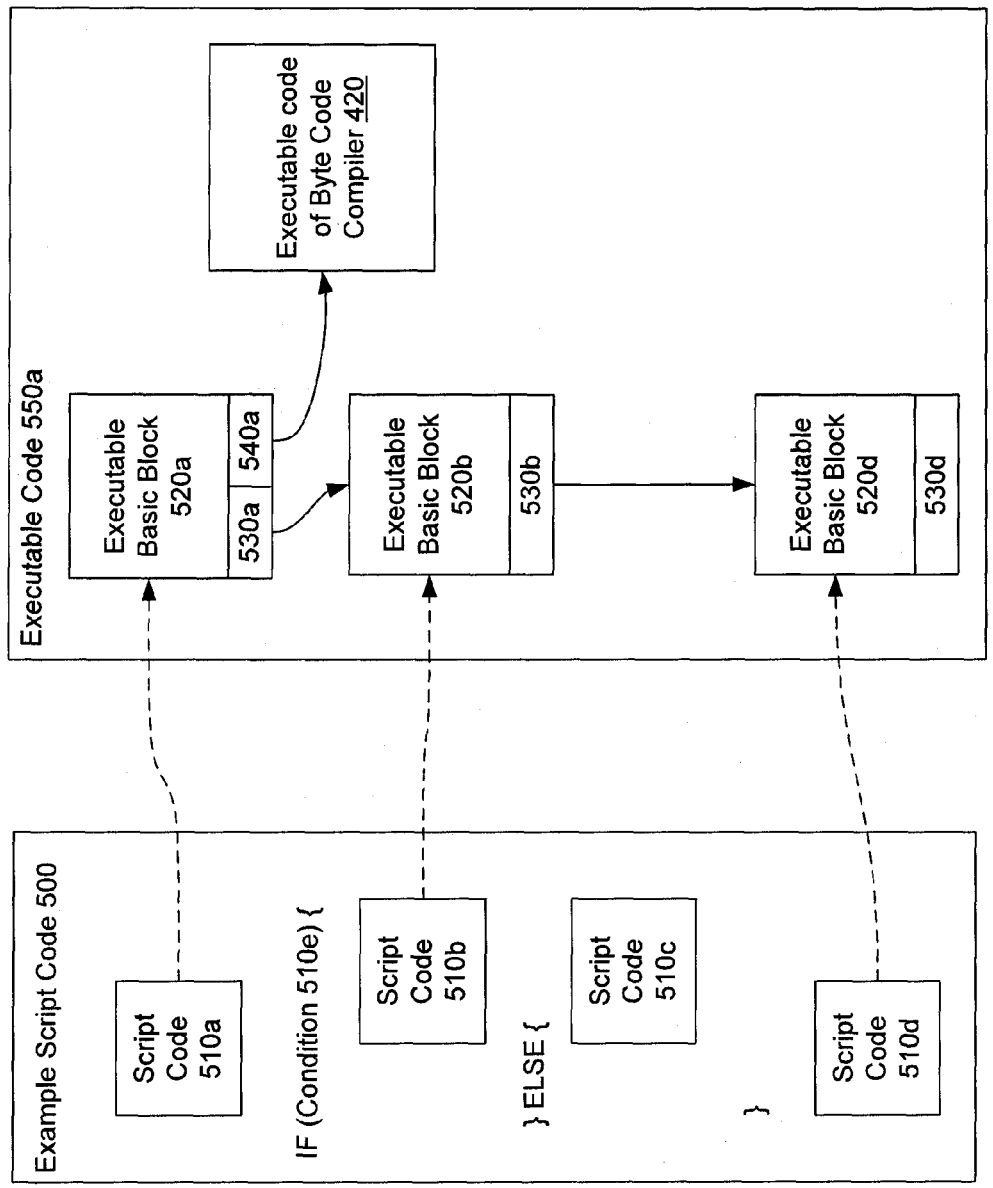
FIG. 5 is a block diagram illustrating incremental compilation of byte code obtained from an example script code.

FIG. 5 illustrates incremental compilation of byte code obtained from an example script code, in accordance with one embodiment of the disclosed technique. FIG. 5 shows an example script code 500 executed in response to a request from client device 160. The example script code 500 includes a portion of byte code 510a followed by an if-then-else statement, followed by another portion of byte code 510d. The if-then-else statement includes a condition 510e, a portion of byte code 510b that is executed if condition 510e evaluates to true, and a portion of byte code 510c that is executed if the condition 510e evaluates to false.

Assume that a request is received from a client 160 that includes values of variables that result in the condition 410e evaluating to true. The resulting executable code generated by the byte code compiler 230 includes the executable code 550a shown in FIG. 5. The portion of script code 510a combined with the condition 510e corresponds to executable code 520a. The executable code 520 includes a guard code 430 in the beginning to verify whether the types of the variables correspond to a specific combination. The end of the executable code 520a includes instructions evaluating the condition 510e. If the condition 410e evaluates to true, the program control is transferred according to exit pointer 530a otherwise the program control is transferred according to exit pointer 540a.

Since the current request received from the client 160 results in the condition 410e evaluating to true, the executable basic block 520b corresponding to portion of script code 510b is also generated. The script code 500 shows that after execution of script code 510b, the script code 510d is executed. Accordingly, the executable basic block 520d corresponding to the script code 510d is also generated. For the execution of the current request, the script code 510c is never executed since it corresponds to the "else" portion of the if-the-else statement that is not executed when the condition 510e evaluates to true. Accordingly, the end of executable basic block 520a includes an exit pointer 540a pointing to the byte code compiler 230 with information identifying byte code corresponding to script code 510c.

If several subsequent requests all include variables with types matching those corresponding to the previous request and result in condition 510e evaluating to true, the executable code 550a can be executed to process these requests. A new set of executable code 550 may be generated if a request is received that requires execution of script code 500 with a new combination of types of variables, different from those corresponding to executable code 550. However, if all requests received from the client device 160 continue providing the same combination of variable types and always result in the condition 510e evaluating to true, the executable code 550 continues to process the requests and no new executable code needs to be generated.

If at any stage, an execution of the script code is performed that provides the previous combination of variable types that cause the condition 510e to evaluate to false, the exit pointer 540a causes the byte code compiler 420 to be invoked causing an executable basic block to be generated corresponding to the script code 510c. The script compiler 110 changes the exit pointer 540a to point to the generated executable basic block instead of the byte code compiler 420. Since the execution of the script code 510c is followed by the execution of the script code 510d, the exit pointer at the end of the executable basic block is configured to point to the executable block 520d corresponding to script code 510d. The executable code 550a which now includes executable block for script code 510c can process requests that result in the condition 510e evaluating to true as well as false without having to invoke the byte code compiler 420. Furthermore, the executable basic block for script code 510c is not generated unless an execution that causes the condition 510e to evaluate to false is received. Accordingly, the script compiler 110 generates executable code in a lazy fashion, the generation performed only if a request requires certain portion of script code to be executed. As a result, the script compiler 110 does not generate dead code, i.e., code that is never executed.

In at least some embodiments, the execution of the script can be further optimized by generating a single executable control region for a set of basic blocks of the script. The executable control region having instructions for executing a set of basic blocks can be generated by combining the executable basic blocks generated for each of the set of basic blocks. The execution engine 240 executes the executable control regions in subsequent requests to execute the executable blocks. The time taken to generate or load one executable control region per multiple basic blocks is lesser compared to the time taken to generate or load one executable block per each of the multiple basic blocks. Accordingly, the efficiency of execution of the script is improved by executing one executable control region instead of executable blocks. However, to combine appropriate executable blocks, the byte code compiler 230 has to have knowledge or context of a set of executable blocks. Since the executable blocks are generated on a need basis, the execution engine 240 may not have the knowledge or context of a group of executable blocks. Accordingly, the execution engine 240 may have to wait until necessary knowledge for further optimization is obtained.

In at least some embodiments, the execution of the script is optimized in two different phases of execution. In a first phase, the execution of the script is optimized by generating the executable blocks for the basic blocks of the script as described in FIGS. 4 and 5. In the second phase, the byte code compiler 230 further optimizes the execution of the script by combining a set of executable blocks (generated in the first phase) whose profiling information satisfies an optimization criterion, and generating an executable control region for the combined set of executable blocks. The executable control region, which is more optimal than the executable blocks generated in the first phase, is stored and executed in response to subsequent requests.

In at least some embodiments, the execution engine 240 collects the profiling information of the executable blocks while the script is executing in the first phase. The executable blocks are configured to have attributes that provide the profiling information. The profiling information can include, but is not limited to, (a) a number of times a particular executable block has executed, (b) a number of times a transition has occurred between a first executable block and a second executable block, (c) a number of times a particular path of execution is encountered by a set of executable blocks, etc.

The optimization criterion includes at least one of (a) a frequency of execution of a particular executable block exceeds a first predefined threshold, (b) a frequency of a particular transition between executable blocks exceeds a second predefined threshold, or (c) a frequency of a particular path of execution encountered by a set of executable blocks exceeds a third predefined threshold. All the thresholds are configurable by a user.

Figure 6:
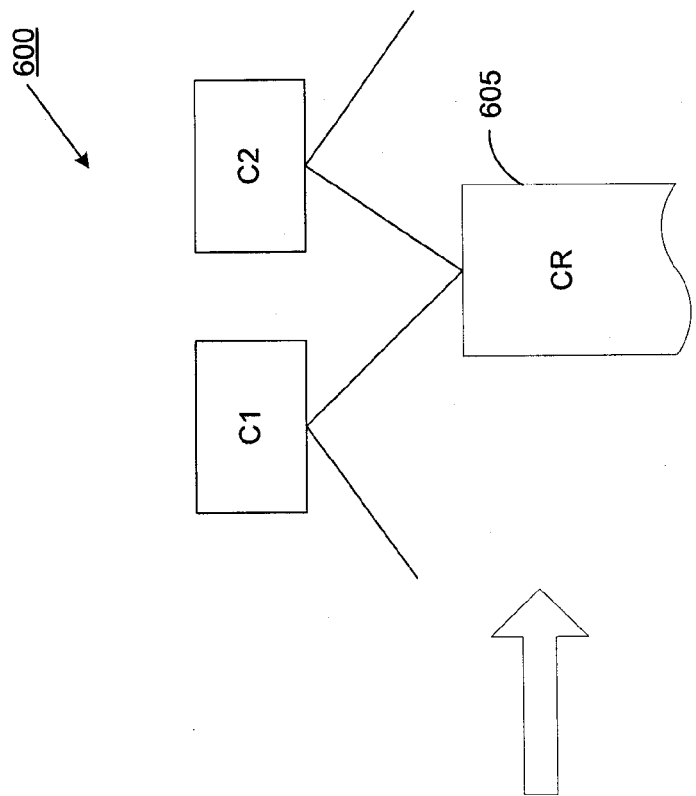
FIG. 6 illustrates an example of combining a set of executable blocks to generate an executable control region based on a frequency of execution of the executable blocks.
Figure 6:
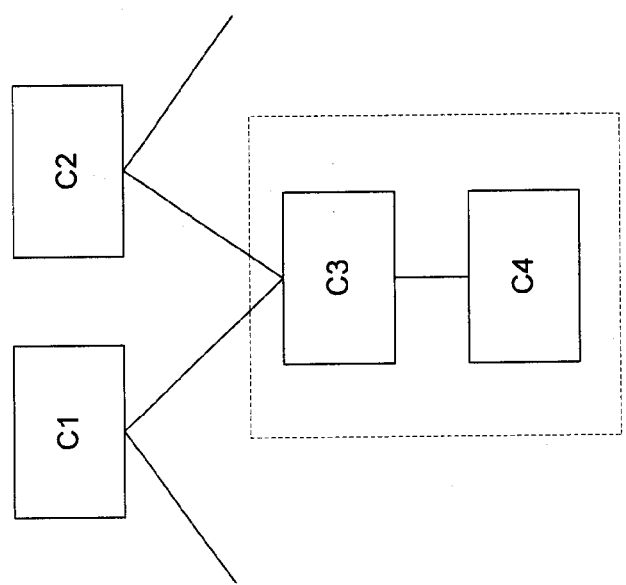
Figure 7:
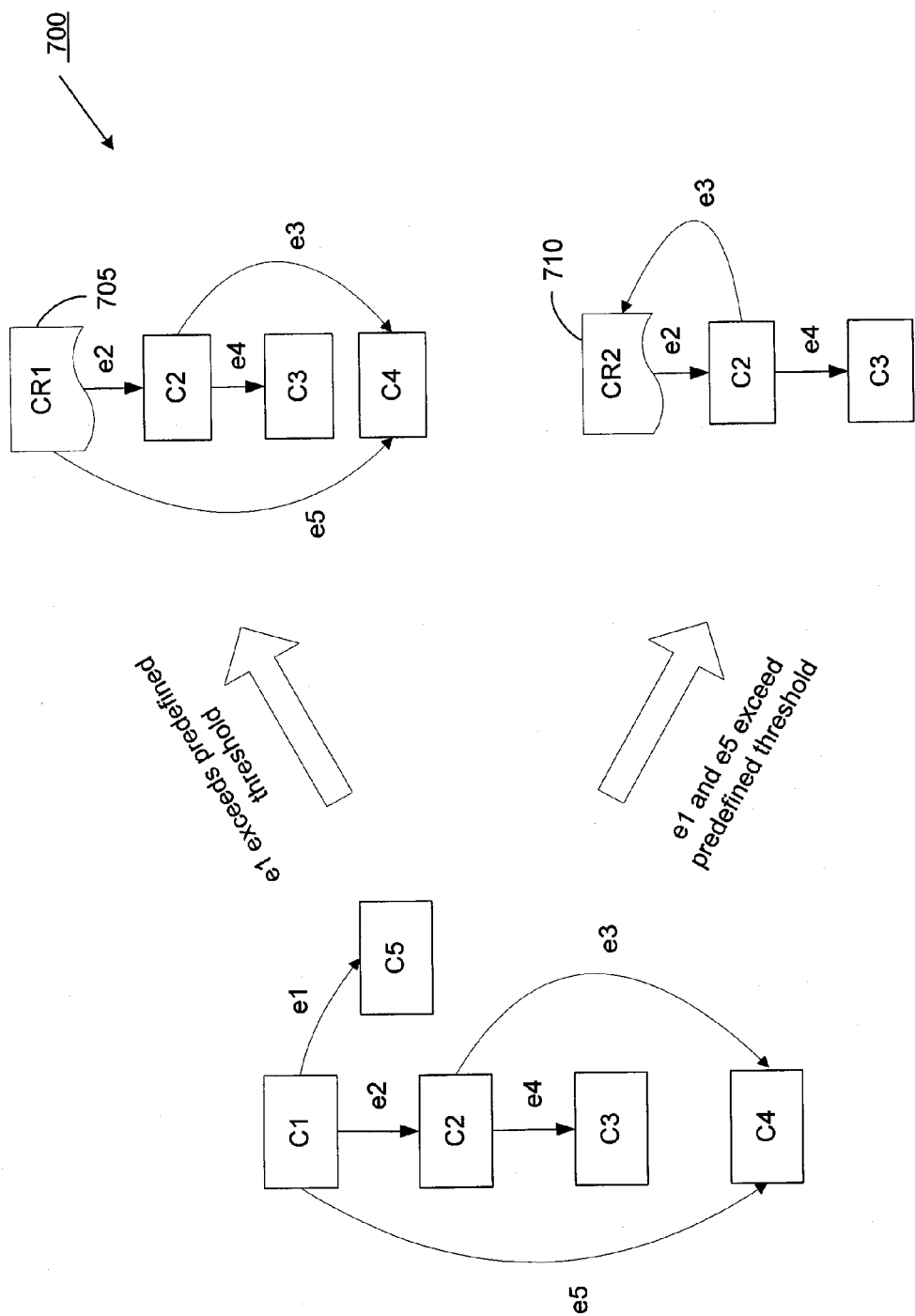
FIG. 7 illustrates an example of combining a set of executable blocks to generate an executable control region based on a frequency of a transition between the executable blocks.
Figure 8A:
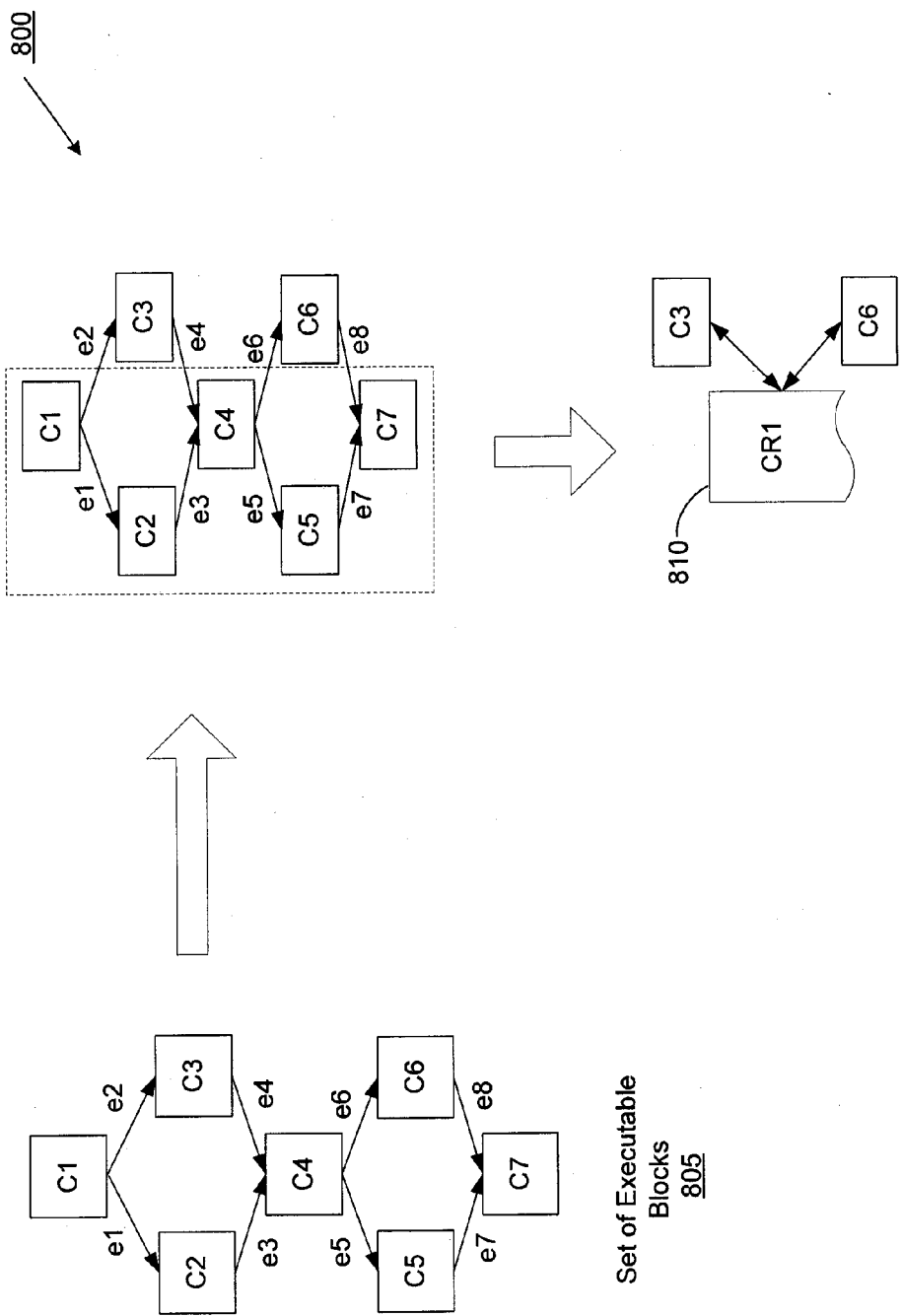
FIGS. 8(a) and 8(b), illustrates an example 800 of combining a set of executable blocks to generate an executable control region based on path profiling or type profiling of the set of executable blocks.
Figure 8B:
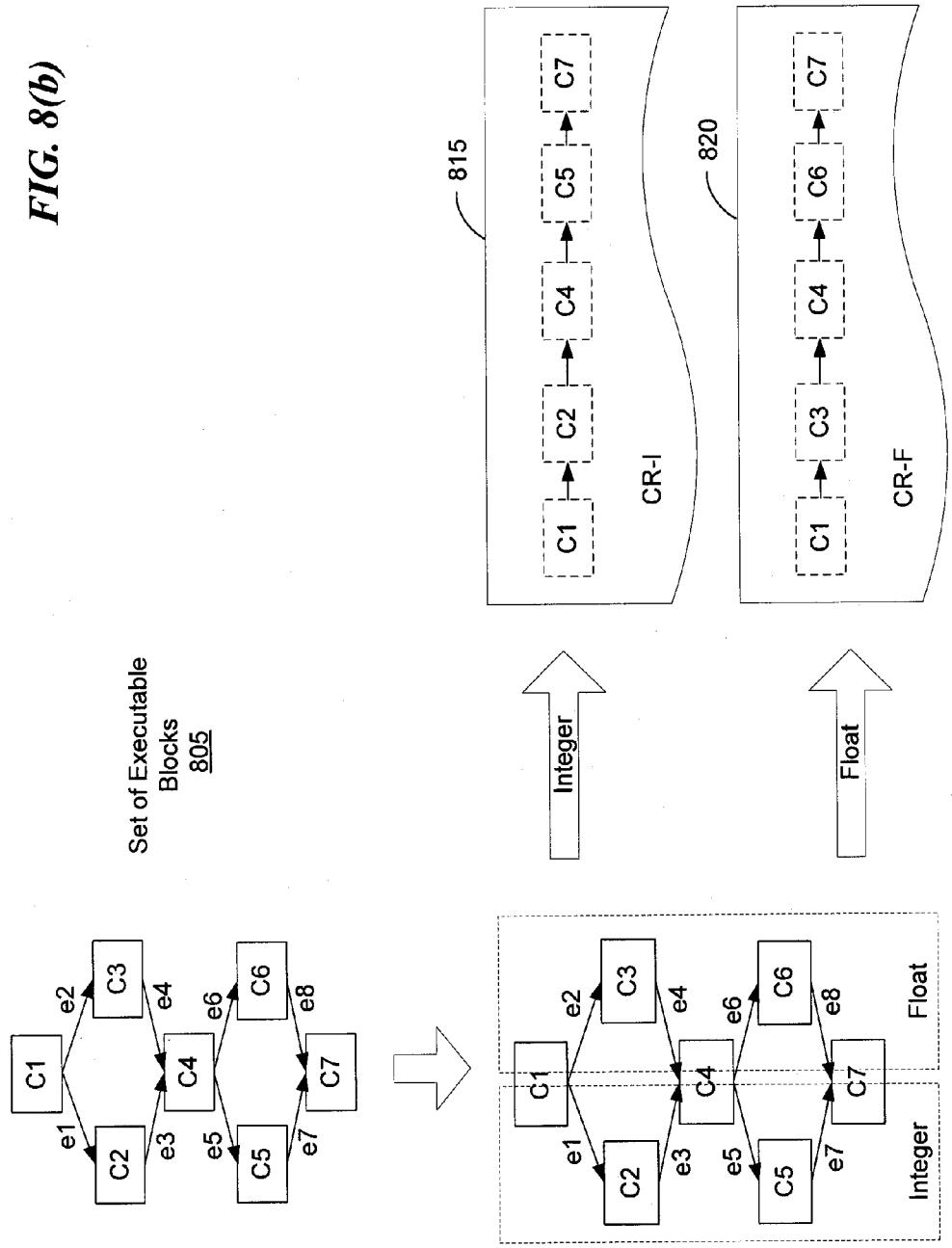

FIGS. 6-8 provide examples of generating an executable control region for a script based on various optimization criteria. The executable blocks C1-C7 shown in FIGS. 6-8 may be similar to executable basic blocks 520a, 520b or 520d, and may be generated as per the techniques of FIGS. 4 and 5.

FIG. 6 illustrates an example 600 of combining a set of executable blocks based on a frequency of execution of the set of executable blocks, according to an embodiment of the disclosed technique. Each of the executable blocks C1-C4 has a counter that has a count of the number of times the executable block has executed over a predefined period of time. The predefined period of time can include, for example, a certain duration since the executable block was created, a certain duration since the executable block executed last, etc. The execution engine 240 identifies the executable blocks that have executed more than a predefined threshold number of times. Assume that the executable blocks C3 and C4 have executed more than the predefined threshold number of times. The executable blocks C3 and C4 are combined to a single executable control region CR 605. The executable control region CR 605 is stored, and executed in subsequent requests to execute the executable blocks C3 and/or C4. The executable control region 605 includes instructions for executing the basic blocks corresponding to the executable blocks C3 and C4. In at least some embodiments, a structure of the executable control region CR 605 is different from the structure of executable blocks C3 or C4.

In at least some embodiments, combining the executable blocks C3 and C4 to generate executable control region CR 605 includes recompiling the basic blocks of the script (or the byte code corresponding to the basic blocks) corresponding to the executable blocks C3 and C4, for example, by the executable control region generator 235, to generate the executable control region CR 605. In at least some other embodiments, executable control region CR 605 may be generated by recompiling the basic blocks of the script (or the byte code corresponding to the basic blocks) corresponding to the executable blocks C3 and C4 using the byte code compiler 230. In at least some other embodiments, the executable control region 605 may also be generated by combining the executable blocks C3 and C4 directly.

FIG. 7 illustrates an example 700 of combining a set of executable blocks to generate an executable control region based on a frequency of a transition between executable blocks, according to an embodiment of the disclosed technique. FIG. 7 shows executable blocks C1-C5 and the transitions e1-e5 between the executable blocks. A transition can be defined as a flow of execution from one executable block to another. For example, a transition (flow of execution) from executable block C1 to C5 is indicated by edge e1. The transitions that can occur between the executable blocks depends on the script code (as described in FIG. 5, for example). The execution engine 240 maintains a counter for each of the edges e1-e5 that provides a count of the number of times a particular transition has occurred over a predefined period of time during the execution of the script. In at least some embodiments, the set of executable blocks between which a frequency of transition exceeds a predefined threshold is identified, and combined to generate an executable control region.

For example, if a frequency of transition e1 exceeds a predefined threshold, executable blocks C1 and C5 are combined to generate an executable control region CR1 705. The executable control region CR1 705 is stored, and executed in future requests to execute the executable blocks C1 and C5. In another example, if frequency of transitions e1 and e5 exceed a predefined threshold, executable blocks C1, C4 and C5 may be combined to generate an executable control region CR2 710.

FIG. 8, which includes FIGS. 8(*a*) and 8(*b*), illustrates an example 800 of combining a set of executable blocks based on path profiling or type profiling to generate an executable control region, according to an embodiment of the disclosed technique. Both figures show a set of executable blocks C1-C7 805 that are generated for executing a portion of a script, and transitions e1-e8 between the executable blocks. FIG. 8(*a*) illustrates combining executable blocks based on path profiling. The execution engine 240 maintains information regarding a path of execution of the script and the executable blocks along the path of execution. The execution engine 240 also has a path counter that provides a count of number of times a particular path of execution has occurred during the execution of the script. A path whose frequency of execution exceeds a predefined threshold is identified and the executable blocks along that path are combined into an executable control region. In at least some other embodiments, a most frequently executing path is identified and executable blocks along the most frequently executing path are combined to generate an executable control region.

For example, as shown in FIG. 8(*a*), if a path of execution such as C1→C2→C4→C5→C7 has occurred more than a predefined threshold number of times in a predefined period of time, then executable blocks C1, C2, C4, C5 and C7 are combined into one executable control region CR1 810.

In at least some embodiments, the executable blocks C1-C7 may be combined into one or more executable control regions based on the types of variables in the basic blocks to which the set of executable blocks correspond. FIG. 8(*b*) illustrates combining executable blocks based on type profiling. As described, for example, in FIGS. 4 and 5, different executable blocks may be generated to handle different combinations of types of the variables in the corresponding basic block of the script. The guard code of an executable block verifies, during the execution, if the type of the variables in the basic block to which the executable block corresponds is of a particular type. If the variables are of a particular type, the executable block is executed, else the control is transferred to another executable block which handles the particular type.

Accordingly, based on the type of variables, the execution engine 240 determines the possible paths of execution of the script. The execution engine 240 may then ask the byte code compiler 230 to generate an executable control region for each of, or some of the possible paths. In at least some embodiments, the executable control region may be generated for a path corresponding to the most frequently appearing variable type.

Consider, for example, a type of a set of variables in the basic block to which the executable block C1 corresponds can be one of an "integer," or a "float." The executable blocks C1 and C4 which have multiple possible transitions decide the path of execution based on the type. Assume that, if the type is "integer," executable block C1 transfers the control to executable block C2 and executable block C4 transfers the control to executable block C5. On the other hand, assume that, if the type is "float," executable block C1 transfers the control to executable block C3 and executable block C4 transfers the control to executable block C6.

Based on the above described execution pattern, the execution engine 240 determines that the path of execution for the variable type "integer" is C1→C2→C4→C5→C7. The execution engine 240 also infers from the above execution path that another path such as C1→C2→C4→C6→C7 cannot be a valid path if the type of the set of variables is "integer" because the path C4→C6 is only executed if the type of the variables is "float" (which is learnt from the guard code in executable block C4). Accordingly, an executable control region may be created for specific paths based on the type of the set of variables. For example, an executable control region CR-I 815 can be created for the path of execution for variable type "integer" by combining executable blocks C1, C2, C4, C5 and C7. Similarly, an executable control region CR-F 820 can be created for variable type "float" by combining executable blocks C1, C3, C4, C6 and C7. In subsequent requests to execute a set of executable blocks, the executable control region created for that specific type is loaded and executed. This improves the execution speed of the script since the time consumed to (a) load one executable control region is lesser compared to loading a number of executable blocks, and (b) perform the guard code checks in a number of executable blocks is eliminated.

Though the above embodiments describe combining the executable blocks based on a frequency of execution of an executable block, a frequency of a transition between executable blocks, a frequency of execution of a particular path, the optimization criteria for combining the executable blocks is not limited to the above described embodiments. Once the execution engine 240 has the necessary profiling information, the executable blocks may be combined in a number of ways to achieve optimization for different scenarios of execution of the script.

Figure 9:
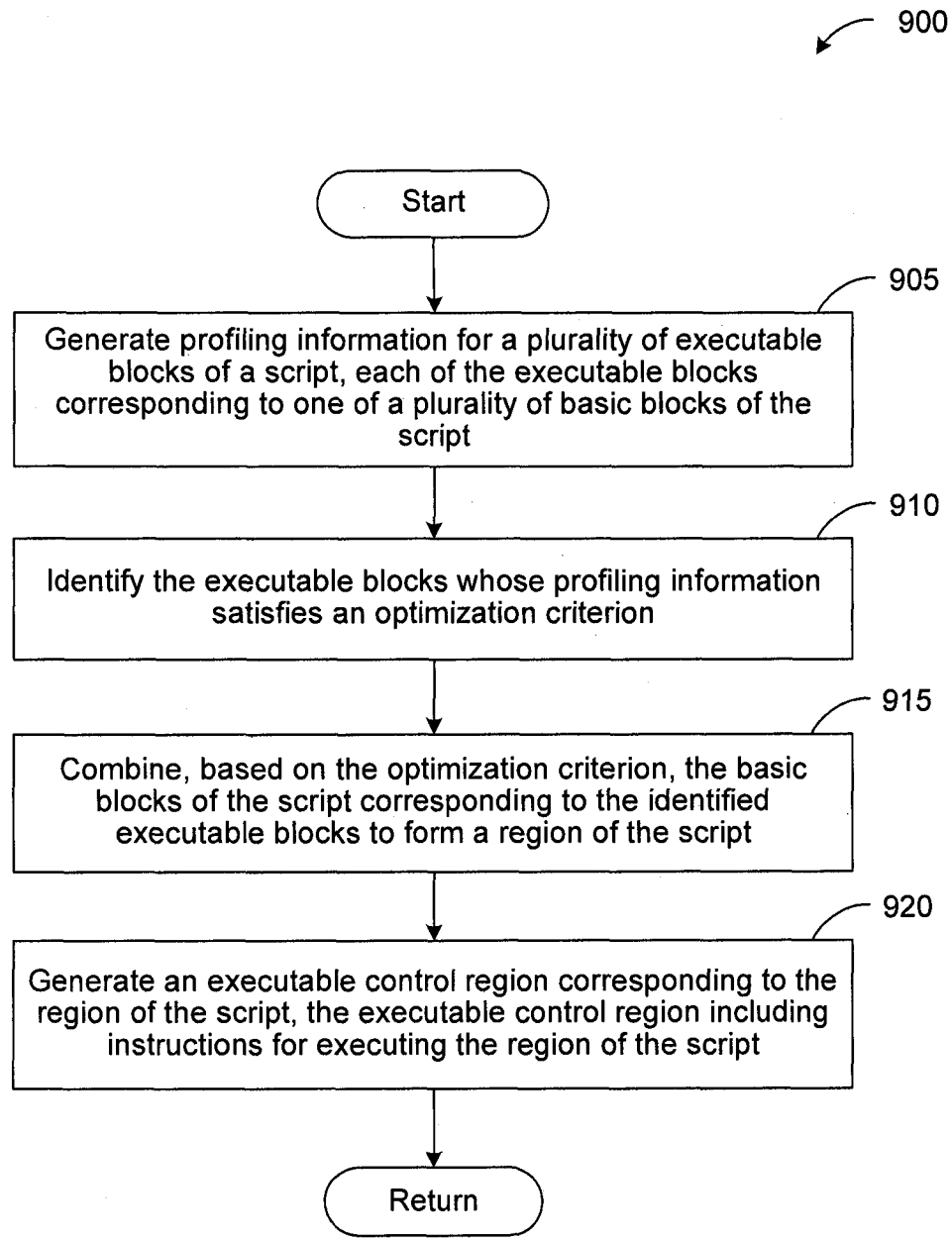
FIG. 9 is a flow diagram of a method of combining executable blocks to generate an executable control region.

FIG. 9 is a flow diagram of a method 900 of combining executable blocks into an executable control region, according to an embodiment of the disclosed technique. The method 900 may be executed in a system such as online system 100. At step 905, the execution engine 240 generates profiling information for a plurality of executable blocks of a script. Each of the executable blocks correspond to one of a plurality of basic blocks of the script, and has instructions to execute the basic block of the script. At step 910, the execution engine 240 identifies a set of executable blocks whose profiling information satisfies the optimization criterion. At step 915, the byte code compiler 230/executable control region generator 235 combines the basic blocks of the script corresponding to the identified executable blocks to form a region of the script. At step 920, the byte code compiler 230/executable control region generator 235 generates an executable control region for the region of the script. The executable control region includes instructions to execute the region of the script.

Figure 10:
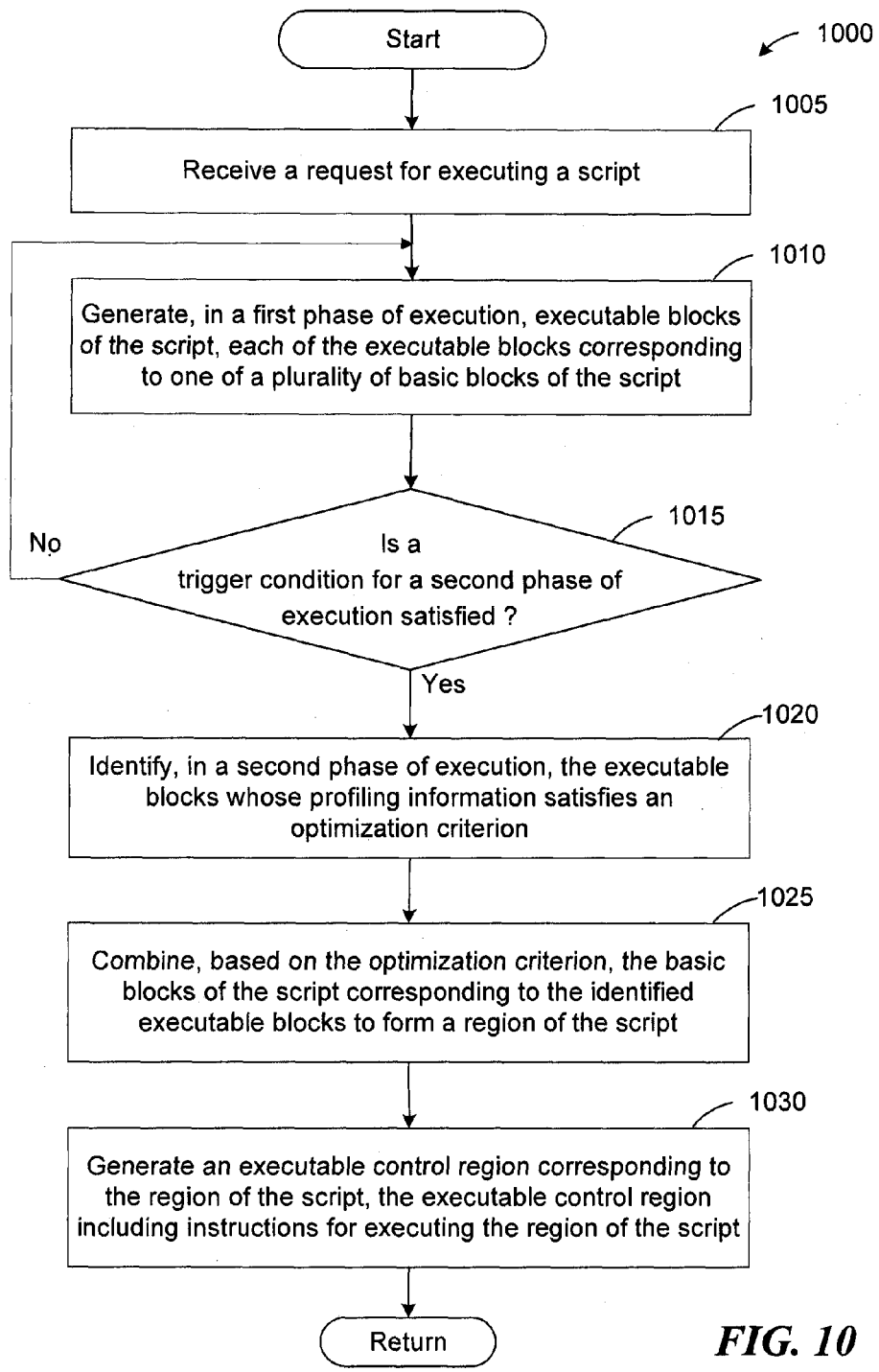
FIG. 10 is a flow diagram illustrating a method of optimizing the execution of the script in a plurality of phases of execution.

FIG. 10 is a flow diagram illustrating a method 1000 of optimizing the execution of the script in a plurality of phases of execution, according to an embodiment of the disclosed technique. The method 1000 may be executed in a system such as online system 100. The first phase of execution begins from step 1005 where the execution engine 240 receives a request to execute a script. At step 1010, the byte code compiler 230 generates a plurality of executable blocks for a portion of the script. Each of the executable blocks corresponds to one of a plurality of basic blocks of the portion of the script. At determination step 1015, the execution engine 240 determines whether a trigger condition for starting a second phase of execution is satisfied.

In at least some embodiments, the trigger condition for starting a second phase of execution includes at least one of (a) a number of the executable blocks generated for the script exceeds a first predefined threshold, (b) a rate at which the executable blocks are generated is below a second predefined threshold, (c) a duration for which the script has executed exceeds a third predefined threshold, (d) a number of times a particular executable block has executed exceeds a fourth predefined threshold, or (e) a number of times any of the executable blocks has executed exceeds a fifth predefined threshold.

Responsive to a determination that the trigger condition for the second phase of execution is not satisfied, the method 1000 returns to step 1010. On the other hand, responsive to a determination that the trigger condition for starting the second phase of execution of is satisfied, at step 1020, the execution engine 240 identifies the executable blocks whose profiling information satisfy the optimization criteria. At step 1025, the byte code compiler 230/executable control region generator 235 combines the basic blocks of the script corresponding to the identified executable blocks to form a region of the script. At step 1030, the byte code compiler 230/executable control region generator 235 generates an executable control region for the region of the script. The executable control region includes instructions for executing the region of the script. The executable control region is stored, and used for executing in response to subsequent requests for executing the script. In at least some embodiments, the executable control region is generated by recompiling the basic blocks from the region of the script.

In at least some embodiments, the execution engine 240 can generate the profiling information in "burst profiling" mode. In the burst profiling mode, the profiling information is generated in a number of short bursts. The frequency of the bursts and a duration of a burst may be configured by the users. Burst profiling helps in minimizing the computing resources consumed for generating the profiling information.

In a distributed environment where the script is running on a number of systems, the execution of the script on the systems may be further improvised by using the profiling information of the script executing on each of the systems in the distributed environment. The profiling information generated by each of the systems is aggregated and an executable control region is generated for the portion of the script corresponding to the aggregated profiling information. FIGS. 11-14 describe various systems and techniques for optimizing the execution of a script in a distributed environment.

Figure 11:
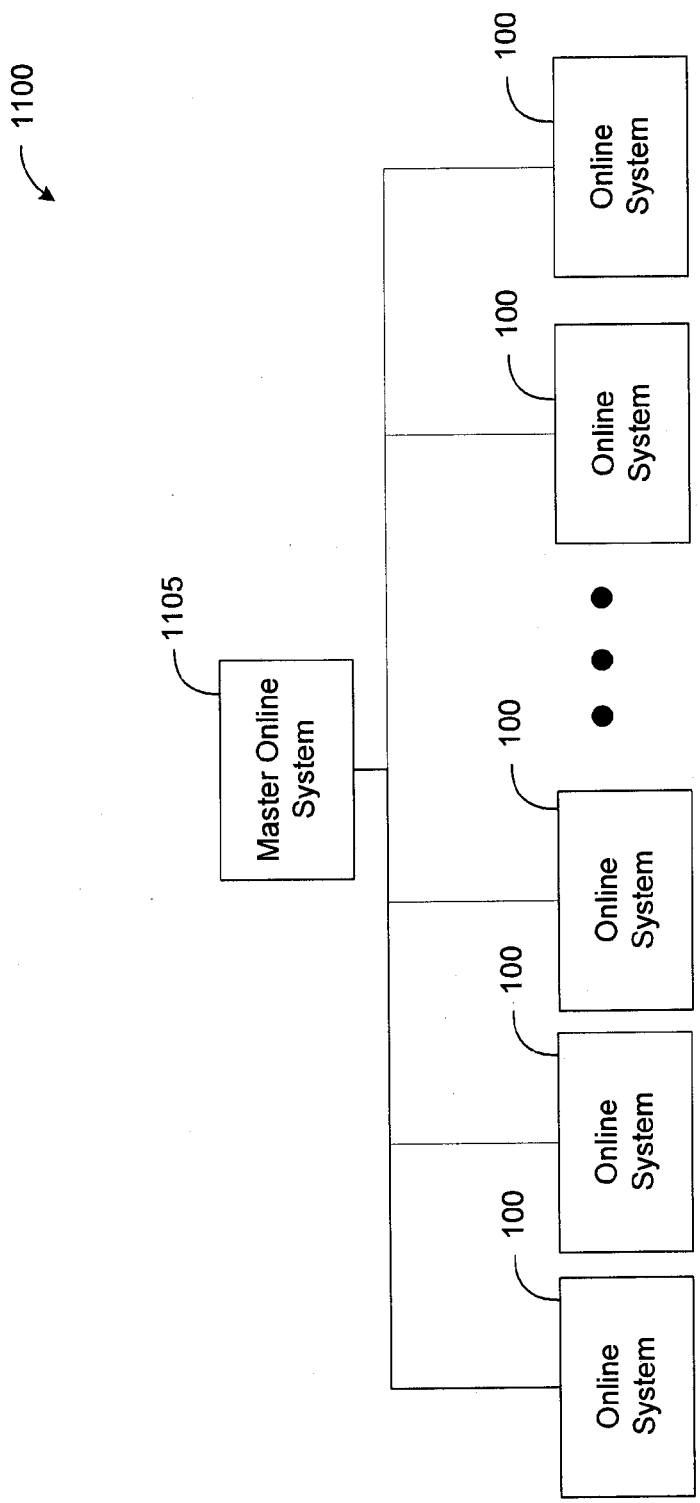
FIG. 11 is a distributed environment in which an embodiment of the invention may operate.

FIG. 11 is a distributed environment in which an embodiment of the invention may operate. The distributed environment 1100 includes a number of online systems 100 executing a script code such as script 500 of FIG. 5. The execution engine 240 in each of the online systems 100 generates profiling information for the script based on the execution of the script in the respective online systems. A master online system 1105 in the distributed environment 1100 obtains the profiling information from each of the online systems 100 executing the script, and aggregates the profiling information to create an aggregated profile. The master online system 1105 identifies the executable blocks of the script corresponding to the aggregated profile, and generates a master executable control region for the portion of the script corresponding to the identified executable blocks. Further, the generated master executable control region is transmitted to each of the online systems 100, where it is stored, and used for executing in response to subsequent requests for executing the script.

Additionally or alternatively, the master executable control region can be generated by each of the online systems 100 instead of the master online system 1105. In such an embodiment, the master online system 1105 transmits the aggregated profile to each of the online systems 100 which further generates the master executable control region based on the aggregated profile.

In at least some embodiments, the master executable control region is more efficient compared to the executable control region generated for each of the online systems 100 separately because the master executable control region is generated considering the execution pattern of the script in the entire distributed environment 1100 rather than an individual online system 100.

The profiling information of the script can be aggregated based on various aggregation criteria. The aggregation criteria includes aggregating profiling information (a) from online systems 100 having a particular type of processor, (b) from online systems 100 executing a particular operating system, (c) from online systems 100 in a particular geography, (d) from each of the online systems 100 based on a frequency of execution of executable blocks, (e) from each of the online systems 100 based on a frequency of transitions between executable blocks, (f) from each of the online systems 100 based on a frequency of execution of a path, or (g) a combination of any of the above criteria.

For example, the master online system 1105 may obtain profiling information such as a list of executable blocks that have executed more than a predefined threshold number of times from each of the online systems 100, and aggregate them to obtain an overall list of executable blocks that have executed most number of times in the distributed environment 1100. In another example, the master online system 1105 may obtain a path (list of executable blocks along the path) that has executed more than a predefined threshold number of times from each of the online systems 100, and aggregate them to obtain an overall list of paths that have executed most number of times in the distributed environment 1100. In yet another example, the master online system 1105 may obtain both a path and a list of executable blocks that have executed more than a predefined threshold number of times from each of the online systems 100, and aggregate them to obtain an overall list of paths and executable blocks that have executed most number of times in the distributed environment 1100.

Figure 12:
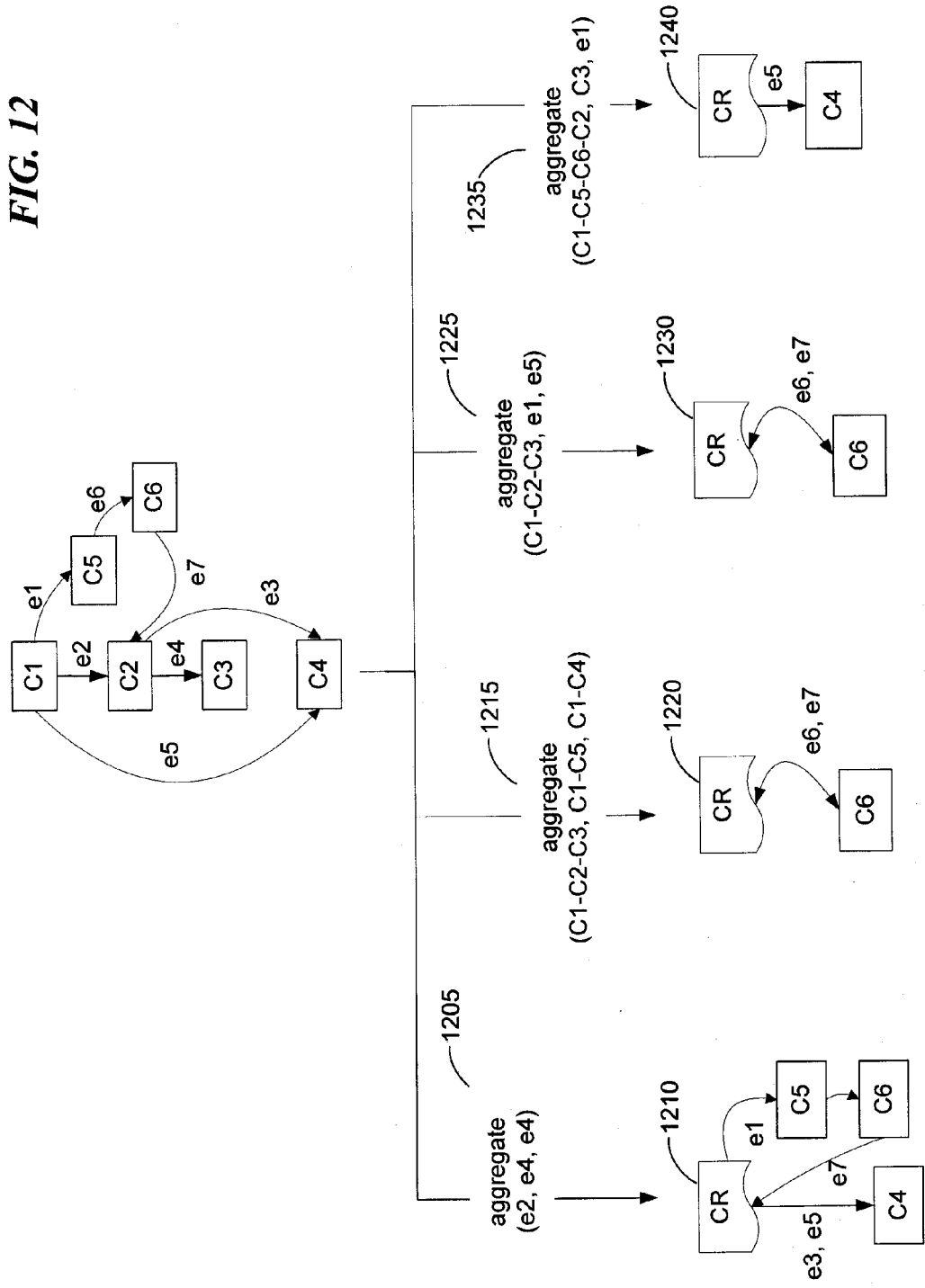
FIG. 12 illustrates examples of master executable control regions generated based on various aggregation criteria.

FIG. 12 illustrates examples of master executable control regions generated based on various aggregation criteria, according to an embodiment of the disclosed technique. FIG. 12 shows executable blocks C1-C6 and the transitions e1-e6 between the executable blocks generated for a portion of a script. The executable blocks C1-C6 may be generated using the techniques described in FIGS. 4 and 5. Consider that the script is executing on three online systems such as online systems 100 of FIG. 11. Each of the three online systems 100 generates profiling information for the script based on the execution of the script in the respective online systems.

In example 1205, the profiling information of three online systems 100 indicate that transitions e2, e4 and e4, respectively, executed more than a predefined number of times. The profiling information from the three online systems 100 is aggregated based on transitions, and a master executable control region 1210 is generated.

In example 1215, the profiling information of three online systems 100 indicate that paths C1-C2-C3, C1-C5 and C1-C4, respectively, executed more than a predefined number of times. The profiling information from the three online systems 100 is aggregated based on paths, and a master executable control region 1220 is generated.

In example 1225, the profiling information of three online systems 100 indicate that path C1-C2-C3, transitions e1 and e5, respectively, executed more than a predefined number of times. The profiling information from the three online systems 100 is aggregated based on a combination of path and transitions, and a master executable control region 1230 is generated.

In example 1235, the profiling information of three online systems 100 indicate that path C1-C5-C6-C2, executable block C3 and transition e1, respectively, executed more than a predefined number of times. The profiling information from the three online systems 100 is aggregated based on a combination of path, number of times of execution of an executable block and transitions. A master executable control region 1240 is generated for the aggregated profile.

Accordingly, profiling information of online systems 100 may be aggregated in various other combinations and using various other criteria for which a master executable block may be created. In at least some embodiments, more than one master executable control region may be created for an aggregated profile.

Figure 13:
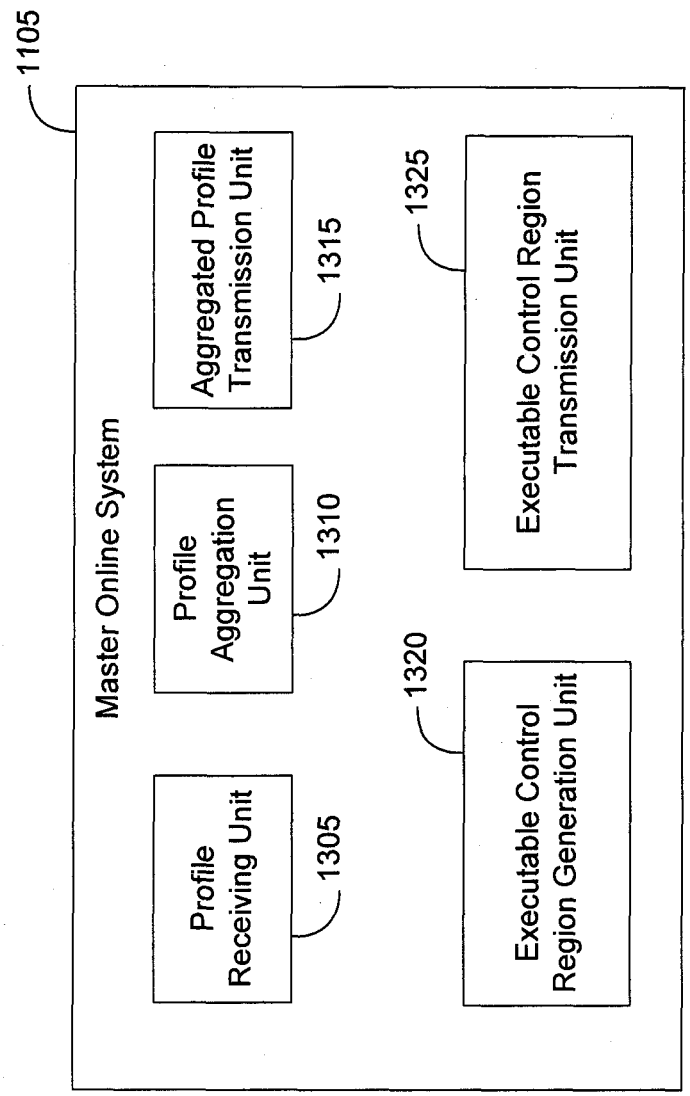
FIG. 13 illustrates a block diagram of an architecture of a master online system that generates a master executable control region based on an aggregated profile.

FIG. 13 illustrates a block diagram of a master online system 1105, according to an embodiment of the disclosed technique. The master online system 1105 can be similar to one of the online systems 100. Additionally, the master online system 100 may include a profile receiving unit 1305, a profile aggregation unit 1310, an aggregated profile transmission unit 1315, an executable control region generation unit 1320, and an executable control region transmission unit 1325.

The profile receiving unit 1305 receives profiling information from various online systems 100 in the distributed environment 1100 executing the script. The profile aggregation unit 1310 aggregates the profiling information based on a predefined aggregation criterion to create an aggregated profile. In at least some embodiments, a user may configure the profile aggregation unit 1310 to consider a particular aggregation criterion. After the aggregated profile is created, the executable control region generation unit 1320 generates the executable control region for the aggregated profile, and the executable control region transmission unit 1325 transmits the executable control region to the online systems 100 in the distributed environment.

In at least some embodiments, aggregation of the profiling information may be performed in response to a trigger such as a predefined time interval, a predefined time of the day, etc. The profile aggregation unit 1310 ensures that the profile receiving unit 1305 has received the most up to date profiling information from the online systems 100 before generating an aggregated profile.

In embodiments where the executable control region is created by the online systems 100, the aggregated profile is transmitted to each of the online systems 100 in the distributed environment 1100 by the aggregated profile transmission unit 1315. Thereafter, each of the online systems 100 generates the executable control region based on the received aggregated profile.

Figure 14:
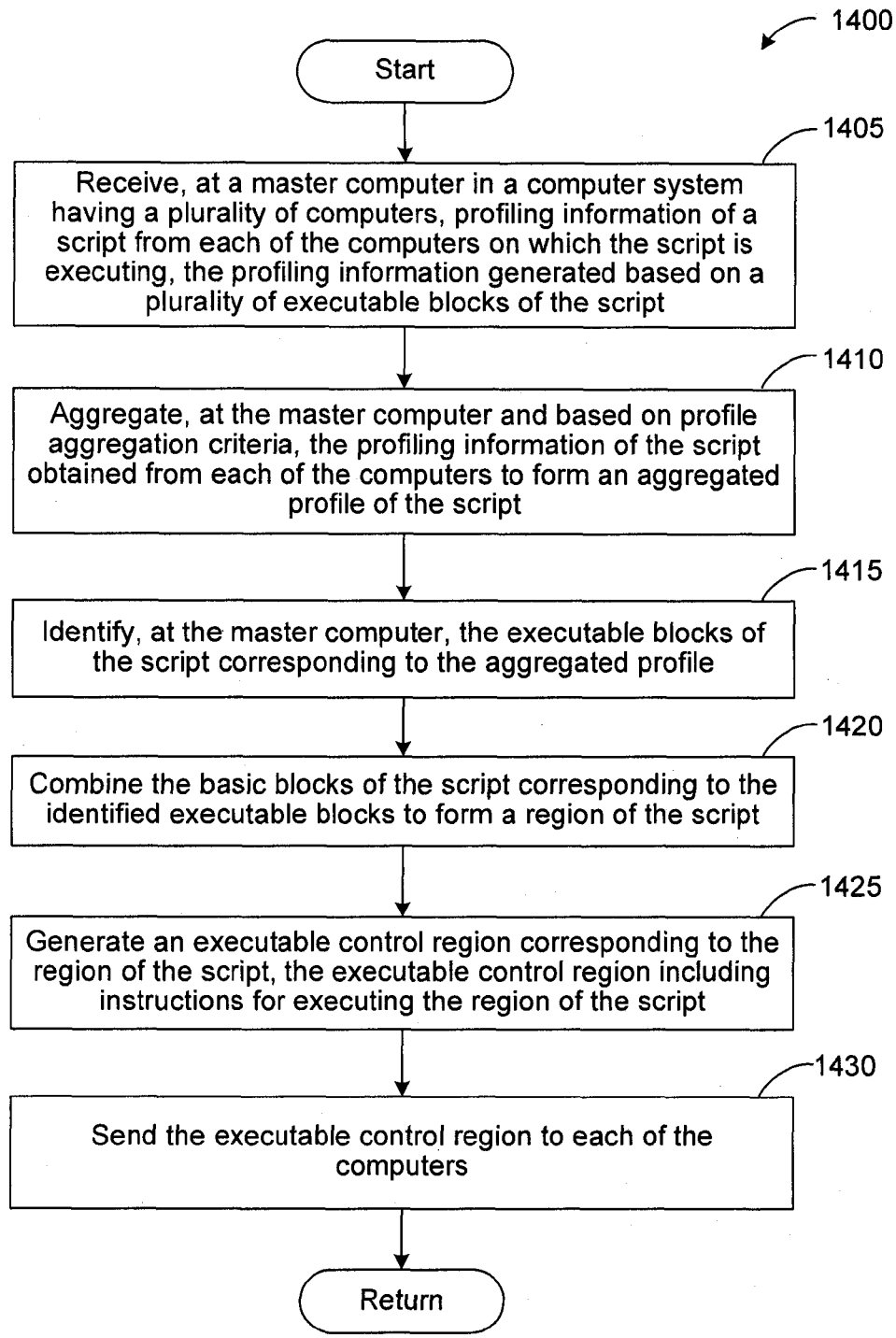
FIG. 14 is a flow diagram illustrating a process of creating an executable control region based on an aggregated profile in a distributed environment.

FIG. 14 is a flow diagram illustrating a process of creating an executable control region based on an aggregated profile in a distributed environment, according to an embodiment of the disclosed technique. The process 1400 may be executed in a distributed environment such as distributed environment 1100. At step 1405, the master online system 1105 receives profiling information from each of the online systems 100 of the distributed environment 1100 that is executing the script. At step 1410, the profile aggregation unit 1310 aggregates the profiling information received from the online systems 100 based on a predefined profile aggregation criterion.

At step 1415, the executable control region generation unit 1320 identifies the executable blocks of the script corresponding to the aggregated profile. At step 1420, the executable control region generation unit 1320 combines the basic blocks of the script corresponding to the identified executable blocks to form a region of the script. At step 1425, the executable control region generation unit 1320 generates an executable control region for the region of the script. At step 1430, the executable control region transmission unit 1325 transmits the executable control region to each of the online systems 100 in the distributed environment 1100 that is executing the script.

In embodiments where the executable control regions for the aggregated profiles are created by each of the online systems 100, the steps 1415-1425 may be executed by each of the online systems 100.

Figure 15:
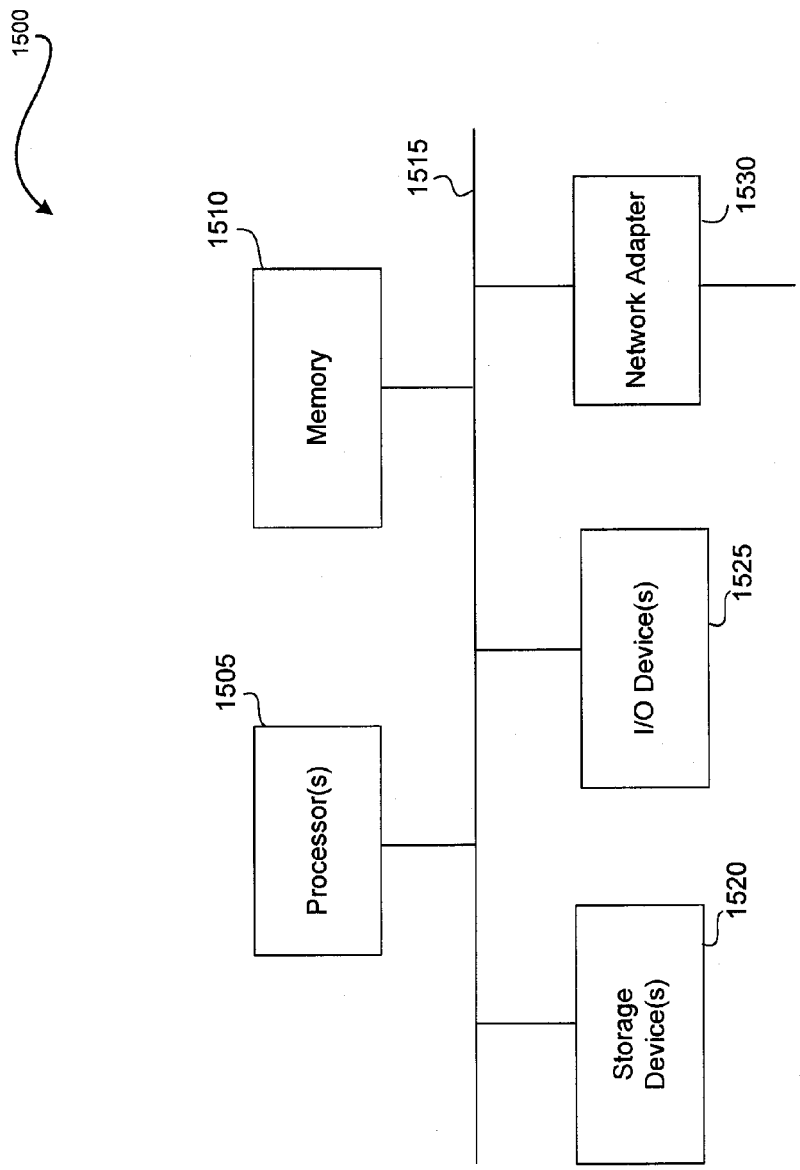
FIG. 15 is a block diagram of a processing system that can implement operations of the present invention.

FIG. 15 is a block diagram of an apparatus that may perform various operations, and store various information generated and/or used by such operations, according to an embodiment of the disclosed technique. The apparatus can represent any computer or processing system described herein. The processing system 1500 is a hardware device on which any of the entities, components or services depicted in the examples of FIGS. 1-14 (and any other components described in this specification), such as client device 160, online system 100, master online system 1105, etc. can be implemented. The processing system 1500 includes one or more processors 1505 and memory 1510 coupled to an interconnect 1515. The interconnect 1515 is shown in FIG. 15 as an abstraction that represents any one or more separate physical buses, point to point connections, or both connected by appropriate bridges, adapters, or controllers. The interconnect 1515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1505 is/are the central processing unit (CPU) of the processing system 1500 and, thus, control the overall operation of the processing system 1500. In certain embodiments, the processor(s) 1505 accomplish this by executing software or firmware stored in memory 1510. The processor(s) 1505 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1510 is or includes the main memory of the processing system 1500. The memory 1510 represents any form of random access memory (RAM), read-only memory (ROM), flash memory, or the like, or a combination of such devices. In use, the memory 1510 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 1505 through the interconnect 1515 are a network adapter 1530, a storage device(s) 1520 and I/O device(s) 1525. The network adapter 1530 provides the processing system 1500 with the ability to communicate with remote devices, over a network and may be, for example, an Ethernet adapter or Fibre Channel adapter. The network adapter 1530 may also provide the processing system 1500 with the ability to communicate with other computers within the cluster. In some embodiments, the processing system 1500 may use more than one network adapter to deal with the communications within and outside of the cluster separately.

The I/O device(s) 1525 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 1510 can be implemented as software and/or firmware to program the processor(s) 1505 to carry out actions described above. In certain embodiments, such software or firmware may be initially provided to the processing system 1500 by downloading it from a remote system through the processing system 1500 (e.g., via network adapter 1530).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 1520 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method comprising:
obtaining, at a master computer in a computer system having a plurality of computers, profiling information of a script from each of the computers on which the script is executing, the profiling information generated based on a plurality of executable blocks of the script;
aggregating, at the master computer and based on profile aggregation criteria, the profiling information of the script obtained from each of the computers to form an aggregated profile of the script;
identifying, at the master computer, the executable blocks of the script corresponding to the aggregated profile;
generating, at the master computer, an executable control region for a region of the script corresponding to the identified executable blocks, the executable control region including instructions for executing the region of the script; and
sending, by the master computer, the executable control region to each of the computers.

2. The method of claim 1 further comprising:
storing, at each of the computers, the executable control region for execution in response to subsequent requests to execute the script.

3. The method of claim 1 further comprising:
executing, at each of the computers, the script using the generated executable control region.

4. The method of claim 1, wherein each of the executable blocks of the script corresponds to one of a plurality of basic blocks of the script, and wherein the executable blocks of the script are generated by
identifying, at each of the computers, a basic block of the basic blocks from the script for execution,
determining a set of types corresponding to variables used in the basic block for the execution of the script, and
generating an executable block of the executable blocks corresponding to the identified basic block, the executable block including instructions verifying whether an input set of values provided for executing the executable basic block conform to the set of types.

5. The method of claim 4, wherein generating the executable control region includes
combining, at the master computer, basic blocks of the script corresponding to the identified executable blocks to form the region of the script.

6. The method of claim 1, wherein obtaining the profiling information includes
identifying, at each of the computers, at least one of (a) executable blocks whose frequency of execution exceeds a first predefined threshold, (b) executable blocks transition between which exceeds a second predefined threshold, or (c) executable blocks along a path whose frequency of execution exceeds a third predefined threshold.

7. The method of claim 1, wherein the profile aggregation criteria includes at least one of (a) aggregating profiling information from computers having a particular type of processor, (b) aggregating profiling information from computers executing a particular operating system, (c) aggregating profiling information from computers in a particular geography, (d) aggregating profiling information from each of the computers based on a frequency of execution of executable blocks, (e) aggregating profiling information from each of the computers based on a frequency of transitions between executable blocks, (f) aggregating profiling information obtained from each of the computers based on a frequency of execution of a path, or (g) aggregating profiling information obtained from each of the computers based on a combination of any of criteria (a)-(f).

8. The method of claim 1, wherein generating the profiling information at each of the computers includes generating the profiling information intermittently.

9. The method of claim 1, wherein the profiling information is aggregated in response to a trigger.

10. The method of claim 9, wherein the trigger includes a predefined time interval.

11. A method comprising:
obtaining, at a master computer in a computer system having a plurality of computers, profiling information of a script from each of the computers on which the script is executing, the profiling information generated based on a plurality of executable blocks of the script;
aggregating, at the master computer and based on a profile aggregation criteria, the profiling information of the script obtained from each of the computers to form an aggregated profile of the script;
sending, by the master computer, the aggregated profile of the script to each of the computers;
identifying, at each of the computers, the executable blocks of the script corresponding to the aggregated profile; and
generating, at each of the computers, an executable control region for a region of the script corresponding to the identified executable blocks, the executable control region including instructions for executing the region of the script.

12. The method of claim 10 further comprising:
storing, at each of the computers, the executable control region for execution in response to subsequent requests to execute the script.

13. The method of claim 10 further comprising:
executing, at each of the computers, the script using the generated executable control region.

14. The method of claim 10, wherein each of the executable blocks of the script corresponds to one of a plurality of basic blocks of the script.

15. The method of claim 10, wherein generating the executable control region includes
combining, at each of the computers, basic blocks of the script corresponding to the identified executable blocks to form the region of the script.

16. The method of claim 10, wherein each of the executable blocks includes instructions verifying whether an input set of values provided for executing the basic block to which the executable block corresponds conform to the set of types of variables used in the basic block.

17. The method of claim 10, wherein the profile aggregation criteria includes at least one of (a) aggregating profiling information from computers having a particular type of processor, (b) aggregating profiling information from computers executing a particular operating system, (c) aggregating profiling information from computers in a particular geography, (d) aggregating profiling information from each of the computers based on a frequency of execution of executable blocks, (e) aggregating profiling information from each of the computers based on a frequency of transitions between executable blocks, (f) aggregating profiling information obtained from each of the computers based on a frequency of execution of a path, or (g) aggregating profiling information obtained from each of the computers based on a combination of any of criteria (a)-(f).

18. An article of manufacture comprising:
- a non-transitory computer readable medium having instructions, which, when executed by a processor, causes the processor to execute a method including
  - obtaining, at a master computer in a computer system having a plurality of computers, profiling information of a script from each of the computers on which the script is executing, the profiling information generated based on a plurality of executable blocks of the script;
  - aggregating, at the master computer and based on profile aggregation criteria, the profiling information of the script obtained from each of the computers to form an aggregated profile of the script;
  - generating, at the master computer, an executable control region for the executable blocks corresponding to the aggregated profile; and
  - sending, by the master computer, the executable control region to each of the computers.

19. The article of manufacture of claim 18, wherein the machine executable instructions which, when executed by the machine, performs the method further comprising:
- executing, at each of the computers, the script using the generated executable control region.

20. The article of manufacture of claim 18, wherein the profile aggregation criteria includes at least one of (a) aggregating profiling information from computers having a particular type of processor, (b) aggregating profiling information from computers executing a particular operating system, (c) aggregating profiling information from computers in a particular geography, (d) aggregating profiling information from each of the computers based on a frequency of execution of executable blocks, (e) aggregating profiling information from each of the computers based on a frequency of transitions between executable blocks, (f) aggregating profiling information obtained from each of the computers based on a frequency of execution of a path, or (g) aggregating profiling information obtained from each of the computers based on a combination of any of criteria (a)-(f).

\* \* \* \* \*